United States Patent

Yanagawa

[15] 3,637,988

[45] Jan. 25, 1972

[54] PUNCHED CARD READING SYSTEM

[72] Inventor: Sakae Yanagawa, Tokyo, Japan

[73] Assignee: Tokyo Shibaura Electric Co., Ltd., Kawasaki-shi, Japan

[22] Filed: Apr. 8, 1970

[21] Appl. No.: 26,740

[30] Foreign Application Priority Data

Apr. 14, 1969 Japan....................................44/28386

[52] U.S. Cl.....................................235/61.6 J, 235/61.11 R

[51] Int. Cl.....................................G06k 17/00

[58] Field of Search....................235/61.7, 61.1, 61.11, 61.6

[56] References Cited

UNITED STATES PATENTS

| | | | |
|---|---|---|---|
| 3,474,230 | 10/1969 | McMillen | 235/61.7 |
| 2,889,984 | 6/1959 | Gruver | 235/61.11 |
| 2,939,631 | 6/1960 | Burstein et al | 235/61.7 |

*Primary Examiner*—Maynard R. Wilbur
*Assistant Examiner*—William W. Cochran
*Attorney*—Kemon, Palmer & Estabrook

[57] ABSTRACT

A punched card reading device which comprises a tag-reading device for reading a tag cut off from a commercial article including a selector for selecting an error tag from normal tags and a keyboard for entering the data of a tag unadapted to be read out, a control circuit for performing the parity, validity and order count check readout of the tag, a selector circuit actuated when there is detected the erroneous reading of the tag, a control switch for stopping, where the tag is found to travel in an abnormal condition, the operation of the reading device so as to eliminate such abnormalities, and transforming circuitry, if necessary, for transforming readout signals representing the data recorded in the tag or supplied by the hand-feed device; a paper tape punching device for punching a paper tape according to the data signals drawn out of the control circuit; and an output device for supplying the data drawn out of the control circuit to an external processing device in an online connection.

3 Claims, 6 Drawing Figures

PATENTED JAN 25 1972 3,637,988

INVENTOR.
BY Sakae Yanagawa
Kemon, Palmer & Estabrook

INVENTOR.
BY Sakae Yanagawa

Kemon, Palmer & Estabrook

INVENTOR.

BY

INVENTOR.
BY Sakae Yanagawa
Kemon, Palmer + Estabrook

PUNCHED CARD READING SYSTEM

The present invention relates to a punched card reading device for reading out data, for example, those punched in a tag attached to a commercial article and, where required, further processing the data thus read out.

In recent years, the techniques of punching data in a card or the like and reading out said data, where required, from said punched card have come to be widely employed in many fields. To control the circulation system of commercial commodities which has recently become increasingly complicated and diversified, it is customarily practised to punch in advance necessary information on their classification codes, prices, etc., in tags attached thereto. When goods are sold, the punched portions of said tags are cut off to be kept by the seller. The data punched in the cutoff slips are later read out to collect and handle information on the goods sold. A conventional tag processing device of this kind only consisted of a type which, as shown in FIG. 1, comprised a tag reader 2 for reading data on a tag 1 and a device 3 for punching a paper tape to record data obtained from said tag. Since, however, the tag was often considerably soiled or damaged, there occurred erroneous reading or the tag was not properly fed to the tag reader 2. Further in extreme cases, a very defective tag failed to be read out by said tag reader 2. Such situation, therefore, did not make the prior art tag reading device sufficiently reliable. Nor has been developed any means for checking and selecting out tags which led to erroneous reading or feeding or those which failed to be read out and later supplying data recorded therein to a tag reader separately by hand. Moreover, data read out of a tag were first punched in a tape 3, so that said data were not directly supplied to an external processing device, thus in some cases retarding the speed of processing said tag data.

The object of the present invention is to provide a system adapted to read out data punched in a card or tag which performs reliable reading, allows, if required, erroneously read data to be again supplied by hand, and readout data to be quickly supplied to an on-line external processing device.

More concretely, the present invention provides a punched card processing system which comprises a punched card reading device comprising means for reading various data on prices or other items which are punched in a card or tag and a selector for distinguishing between properly read cards and erroneously read cards (hereinafter respectively referred to as "normal and error cards"); manual input device for allowing data recorded in error cards or those unadapted to be directly read out by said reading device to be again supplied thereto by hand; a control circuit for checking the parity, validity and order count of data signals read out of punched cards or tags and also determining whether a given card or tag is capable or incapable of being read out, where erroneous reading is detected, controlling the selector of the reading device so as to distinguish between normal and error cards or tags, where cards or tags travel through the reading system in an abnormal condition, stopping the operation of the reading system, and, if necessary, transforming (encoding or rearranging) data supplied from the punched card reading device or manual input device; a device for punching a paper tape according to the data drawn out of said control circuit; and an output device for supplying the data drawn out of said control circuit to an external data processing device when an on-line connection is demanded. This invention can be more fully understood from the following detailed description when taken in connection with reference to the accompanying drawings, in which:

Figures 1, 2:
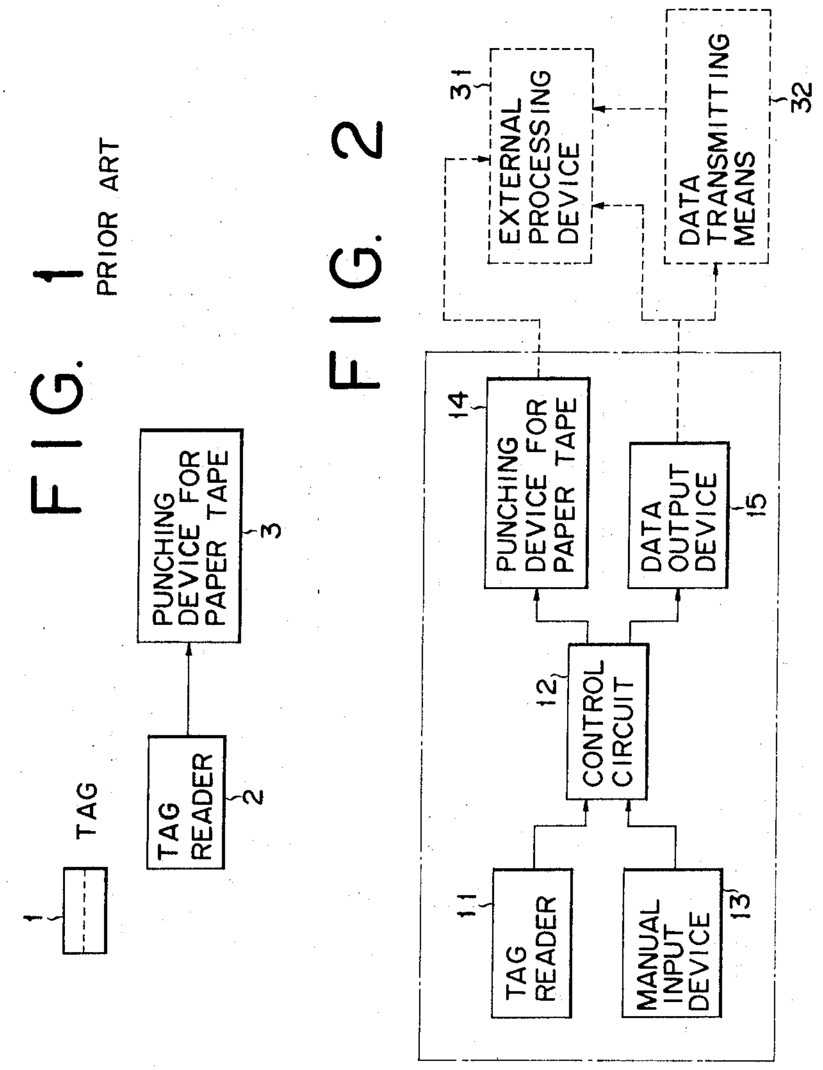
FIG. 1 PRIOR ART, FIG. 2
FIG. 1 is a block diagram of a prior art punched card reading device.
FIG. 2 is a block diagram of a punched card reading system according to an embodiment of the present invention.

There will now be described an embodiment of the present invention by reference to the appended drawings. FIG. 2 represents a tag-reading system as an illustration of said punched card reading system. A tag reader 11 collectively reads out information on the classification codes, prices, etc., of commercial commodities which is punched in the data strips constituting part of tags attached thereto after they are cut off therefrom. A control circuit checks the parity, validity (if there are read out the codes which are not employed by the system, it is considered as an error) and order count (if the readout order count of a code recorded in the data strip of a tag does not agree with a prescribed number, it is taken as an error) of data read out by said tag reader 11, determines whether the data strip of a given tag is capable or incapable of being read out, where there is detected an error card or tag, controls a selector 28 so as to distinguish it from a normal one. In case such an error tag is detected, said control circuit 12 is switched from said tag reader 11 to a manual input device 13, for example, a keyboard, and data recorded in said error tag are later supplied again by hand to the system. Also where the tag travels in an abnormal condition, then the control circuit 12 turns off the source of the system to stop its operation. Further, if necessary, the control circuit 12 transforms (encodes or rearranges) input data from said keyboard 13. When output data thus transformed are supplied to a paper tape punching device 14, the paper tape is punched according to said data so as to temporarily store them therein. The data punched in said tape are supplied to an external data processing device 31, for example, an electronic computer to be processed thereby. If it is required quickly to process the tag data by operating said external processing device 31 on line, then the control circuit 12 is connected to a data output device 15 for on-line operation. Output signals from the control circuit 12 are supplied to said external processing device 31 directly or through a data-transmitting means 32 and the punched card reading system is operated on line.

Figure 3:
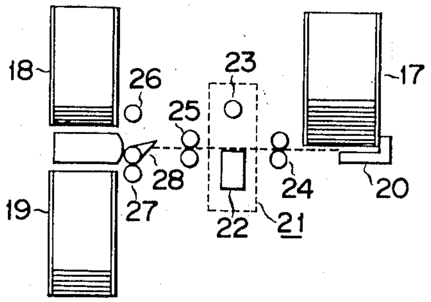
FIG. 3 represents the concrete arrangement of a data-reading device involved in the embodiment of FIG. 2.

There will now be described by reference to FIG. 3 the concrete arrangement of the tag reader 11. There are juxtaposed a tag-feed hopper 17 for receiving tags 16 and an error tag receiving hopper 18. Opposite to the error tag receiving hopper 18 is disposed a normal tag receiving hopper 19. To the end of the tag-feed hopper 17 at which the tag is introduced into the reading system there is fitted a tag feeder 20 so as to contact the outermost one of collected tags and take it out sidewise by reciprocating motion. Substantially half way between the mutually facing portions of the normal tag receiving hopper and error tag receiving hopper 18 and the tag feeder 20 is positioned a read head 21, which is photoelectric type consisting of a head body 22 and lamp 23. This read head may also consist of a sensing pin type. Near the tag inlet and outlet of the read head 21 are placed a first pair of guide rollers 24 and a second pair of guide rollers 25 respectively. Near the mutually facing portions of the error tag receiving hopper 18 and normal tag receiving hopper 19 are provided a third pair of guide rollers 26 and fourth pair of guide rollers 27 respectively. Between these third and fourth pairs of guide rollers 26 and 27 is set a selector 28.

In the tag reader 11 arranged as described above, tags 16 received in the feed hopper 17 are taken out one by one at a prescribed interval by the tag feeder 20, and carried to the read head 21 while being held between the first paired guide rollers 24. In the read head 21, a tag 16 taken out passes between the lamp 23 and head body 22. At this time, there are readout data punched in said tag 16, and the output signals are sent to the control circuit 12 to be subjected to the aforementioned various checks. After leaving the read head 21, the tag 16 further travels while being held between the second paired guide rollers 25. At this point, the tag 16 undergoes the aforesaid various checks by the control circuit 12. Unless there is detected any abnormality, the tag 16 is conducted to the selector 28 and fourth paired guide rollers 27 to be received in the normal tag hopper 19. If the tag 16 is found to have been erroneously read, then there is indicated such error and the selector 28 is so actuated as to bring the error tag to the error tag receiving hopper 18 through the third paired guide rollers 26. It will be noted that tags may be taken out one by one at a prescribed interval as described above or continuously from the feed hopper 17.

Figure 4A:
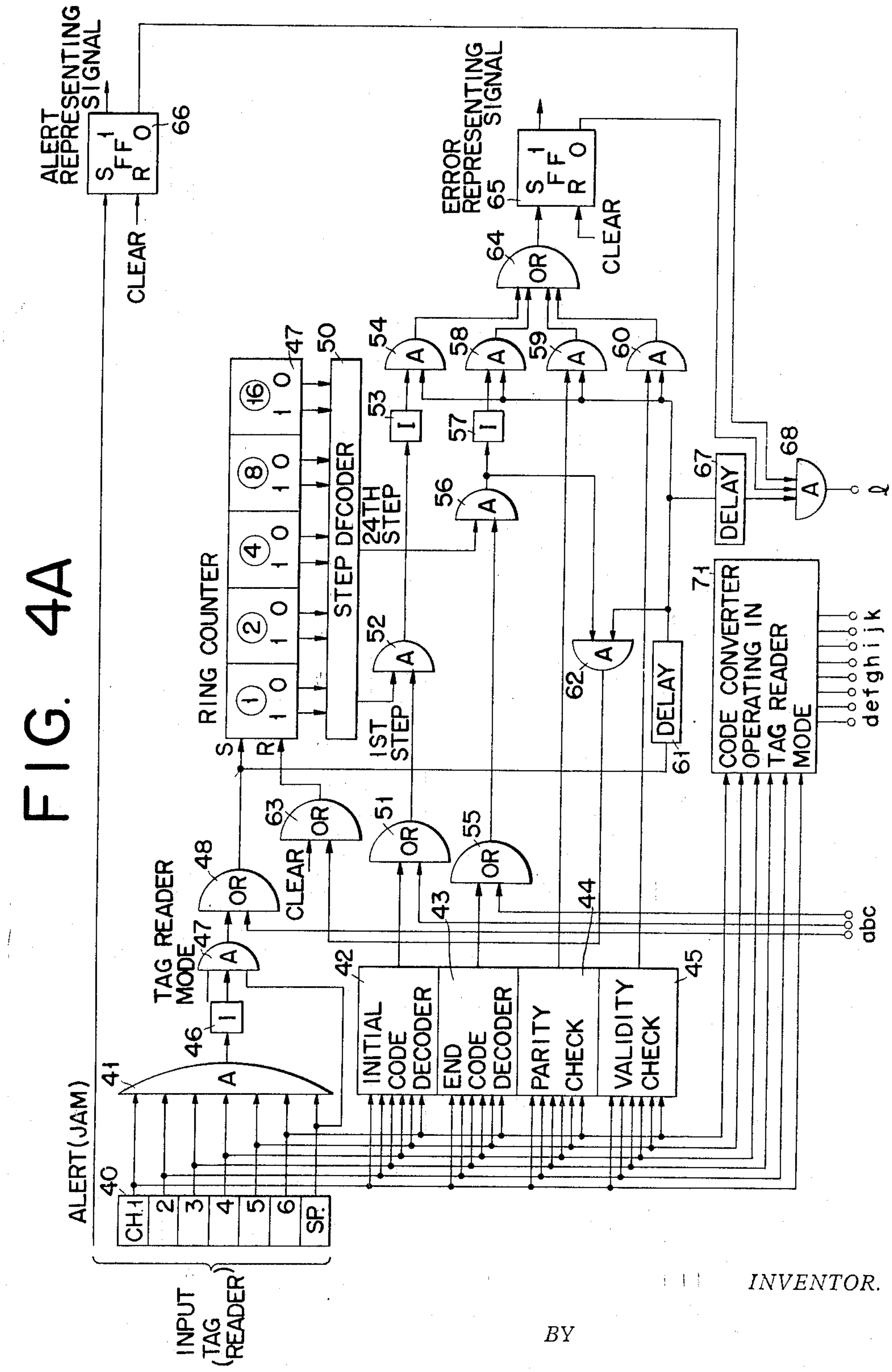
FIGS. 4A and 4B show the concrete arrangements of a control circuit involved in the embodiment of FIG. 2.
Figure 4B:
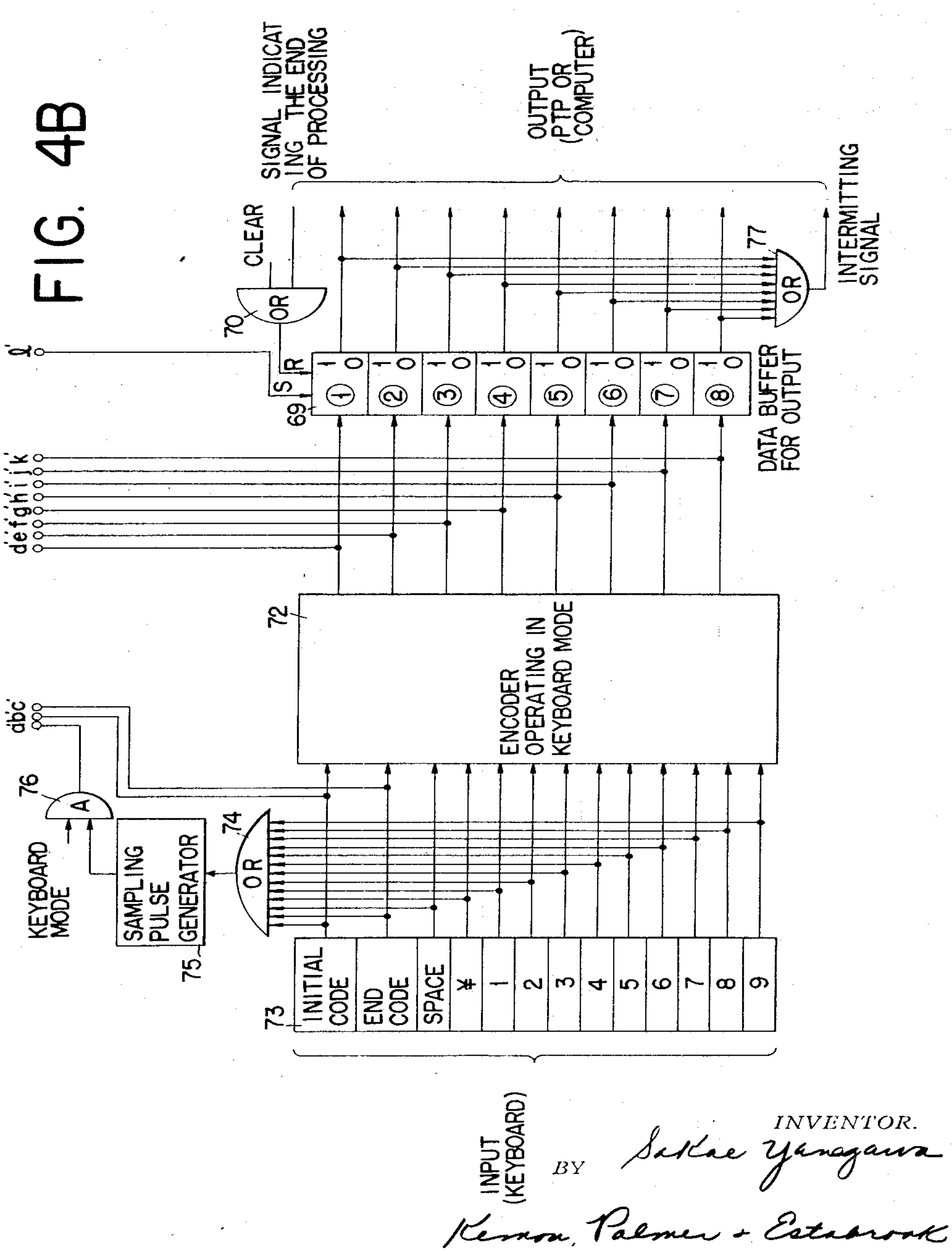

There will now be described the concrete arrangement of the control circuit 12 by reference to FIGS. 4A and 4B. Terminals *a*, *b*, ... *k* and *l* of FIG. 4A are respectively connected to terminals *a'*, *b'*, ... *k'*and *l'* of FIG. 4B. The tag information generally consists of 24 letters, each letter containing data of 6 bits. The output terminal 40 of the tag reader 11 generating signals for detecting six-bit information and sprocket hole from the read head 21 is connected to an AND-circuit 41 for receiving information from the tag reader 11, and also to an initial code decoder 42 for detecting the initial code of the first letter, and end code decoder 43 for detecting the end code of the 24th letter, a parity check circuit 44 and validity check circuit 45 in turn. The output terminal of the AND-circuit 41 is connected to the set input terminal of a ring counter 49 through a serial circuit consisting of a first inverter 46, AND-circuit 47 supplied with input signals in tag reader mode and a first OR-circuit 48 supplied with input signals either from the tag reader 11 or the keyboard 13 as need arises. The input terminal of the AND-circuit 47 is supplied with signals for detecting the sprocket hole. A plurality of output terminals of the ring counter 49 are connected to a step decoder 50. The output terminal of the initial code decoder 42 is connected through a second OR-circuit 51 supplied with input signals either from the tag reader 11 or the keyboard 13 as occasion demands to the output terminal of the step decoder 50 for generating first step signals corresponding to the first one of the 24 letters recorded in the tag 16, and also to an AND-circuit 52 for detecting the initial code. The output terminal of said AND-circuit 52 is connected through a second inverter 53 to an AND-circuit 54 for checking the first order counter. The output terminal of the end code decoder 43 is connected through an OR-circuit 55 supplied with input signals either from the tag reader 11 or the keyboard 13 as is required to the output terminal of the step decoder 50 for generating the 24th step signals corresponding to the last one of the 24 letters recorded in the tag 16 and also to an AND-circuit 56 for detecting the end code. The output terminal of said AND-circuit 56 is connected through a third inverter 57 to an AND-circuit 58 for checking the second order count. The output terminal of the parity check circuit 44 and that of the validity check circuit 45 are connected to an AND-circuit 59 for checking the parity of readout data signals and an AND-circuit 60 for checking the validity thereof respectively. The output terminal of the first OR-circuit supplied with input signals either from the tag reader 11 or the keyboard 13 as the case may be is connected through a first delay circuit 61 to the input terminals of the AND-circuits 54 and 58 for checking the first and second order counts and those of the AND-circuit 59 for checking the parity and the AND-circuit 60 for checking the validity. The output terminals of the first delay circuit 61 and the AND-circuit 56 for checking the end code are connected to an AND-circuit 62 for clearing the ring counter 49. The output terminal of said AND-circuit 62 is connected through an OR-circuit 63 for clearing the ring counter 49 to the reset input terminal of the ring counter 49. The OR-circuit is also supplied by hand signals for clearing the ring counter 49. The output terminals of the AND-circuits 54 and 58 for checking the first and second orders, AND-circuit 59 for checking the parity and AND-circuit 60 for checking the validity are connected through an OR-circuit 64 for checking errors to the set input terminal of a flip-flop circuit 65 for checking errors. The reset input terminal of said flip-flop circuit 64 is supplied by hand with clearing signals. The set output signal drawn out when the set input terminal receives signals represents errors. The jam signals detected when the tag fails to be read out and the travelling state of the tags are out of order are supplied to the set input terminal of flip-flop circuit 66 for detecting alert signals. The set output from the flip-flop circuit 66 represents an alert signal. The reset input terminal of the flip-flop circuit 66 is supplied by hand with clearing signals. The output terminal of the first delay circuit 61 is connected through a second delay circuit 67 to an AND-circuit 68 for controlling a data buffer 69. The reset terminals of the flip-flop circuit 65 for detecting errors and flip-flop circuit for detecting alert signals are also connected to the AND-circuit 68. The output terminal of the AND-circuit 68 is connected to the set input terminal of a data buffer 69 for generating output signals. The reset input terminal of the buffer 69 is connected to the output terminal of an OR-circuit 70 which is supplied with signals from outside of this control circuit 12 which indicate the end of a processing operation and clearing signals generated by hand. The output terminal of the tag reader 11 generating signals for detecting six-bit information and sprocket hole from the read head 21 is connected to a code converter 71 for changing signals from the tag reader 11 which represent a code of six bits per letter to signals denoting a code of eight bits per letter. The eight output terminals of the code converter 71 are respectively connected to eight flip-flop circuits constituting the data buffer 69. The output terminal 73 of the keyboard 13 generating signals representing thirteen different letters, namely, initial code, space, ¥ and digits of 1 to 9 is connected to an encoder 72 for encoding these letter signals into signals representing a code of eight bits per letter. The eight output terminals of the encoder 72 are respectively connected to eight flip-flop circuits constituting the data buffer 69. The aforesaid 13 output terminals are connected to an OR-circuit supplied with information from the keyboard 13. The output terminal of the OR-circuit 74 is connected to the first OR-circuit 48 supplied with signals either from the tag reader 11 or the keyboard 13 as need arises through a sampling pulse generator 75 and AND-circuit 76 supplied with signals in keyboard mode. Among the aforesaid 13 output terminals, those generating signals representing the initial and end codes are connected to the second and third OR-circuits 51 and 55 supplied with signals either from the tag reader 11 or the keyboard 13. The output terminal of the data buffer 69 for generating output signals is connected either to a paper tape punching means or a data supply device for on-line operation to supply an external data processing device with interrupting signals through an output OR-circuit 77.

There will now be described a control circuit having the aforementioned arrangement with respect to the cases where there are supplied data from the tag reader 11 and where they are supplied from the keyboard 13. As a tag punched with data moves along, there are supplied signals for detecting information on six bits per letter and the sprocket hole from the output terminal of the tag reader 11 through the AND-circuit 41 and first inverter 46 to the AND-circuit 47 for receiving input signals in tag reader mode. Before there are supplied data from the tag reader 11, the AND-circuit 47 is supplied in advance by hand with signals in tag reader mode indicating that the tag reader will be used. When there are detected by the read head 21 signals representing information on any of said six bits and the sprocket hole, then the AND-circuit 47 sets the ring counter 49 through the OR-circuit 48. The ring counter counts 24 letters from the initial code to the end code. When the initial code is detected by the initial code decoder 42, there is drawn out of the step decoder 50 the first step signal corresponding to the first one of the 24 letters. When the AND-circuit 52 detects that the first letter is the initial code, then the first AND-circuit 54 for checking the order count generates signals, showing that the first letter is not wrong. And when the second AND-circuit 58 for checking the order count confirms that the 24th letter is an end code, then said AND-circuit 58 sends forth signals, indicating that the order was not erroneously read out. Further when there is no agreement between the number of orders or letters and the prescribed number, then the first and second AND-circuits 54 and 58 generate error signals to check the order count. Output signals from the AND-circuit 56 which detected the end code resets the ring counter 49. When there are drawn error signals out of the parity check circuit 44 and validity check circuit 45, then the corresponding AND-circuits 59 and 60 also issue error signals. The AND-circuits 54, 58, 59 and 60 are synchronizingly supplied with signals which were delayed by the length of time required for the ring counter 49 and step decorder 50 of the delay circuit 61 to count one letter. When there are detected error signals by checking any of the order count, parity and validity of the data signals read out, the flip-flop circuit 65 is set. This set output represents errors. When there is found a tag incapable of being read out from its unduly delayed travel, then there are generated jam signals which set the flip-flop circuit 66 to indicate an alert. Error or alert signals so control the selector 28 of the tag reader 11 as to cause an error tag which gave rise to such error or alert signals to be received in the error tag receiving hopper 18. Alert signals detected when the travelling is out of order so control the power source of this system as to be switched off.

After the error tag is received in said hopper 18, there are supplied clearing signals from the keyboard 13 to the flip-flop circuits 65 and 66 to reset them and set the data buffer 69. Data read out by the tag reader 11 are converted in code by the code converter 71 and supplied through the data buffer 69 to the punched card reading system or a data supply device for on-line operation 15.

Data recorded in an error tag received in the hopper 18 are again supplied by hand from the keyboard 13. The AND-circuit 75 for receiving signals in keyboard mode is supplied with signals indicating that there is used the keyboard. Signals from the keyboard 13 which represent the 13 different letters are subjected to sampling and supplied through the AND-circuit 75 and first OR-circuit 48 to the ring counter 49 to set it. Signals from the keyboard 13 which represent the initial and end codes are supplied to the second and third OR-circuits 51 and 55 respectively. And as in the case where there are received data from the tag reader 11, the first and second AND-circuits 54 and 58 detect the initial and end codes to check the order count. When there are detected errors by said check, the flip-flop circuit 65 generates signals indicating said errors. Signals from the keyboard 13 which represent 13 different letters are encoded by the encoder 72 into signals denoting a code of eight bits per letter and supplied to the data buffer 69. The data buffer 69 is reset by signals indicating the completion of a processing operation or clearing signals from the keyboard 13.

Figure 5:
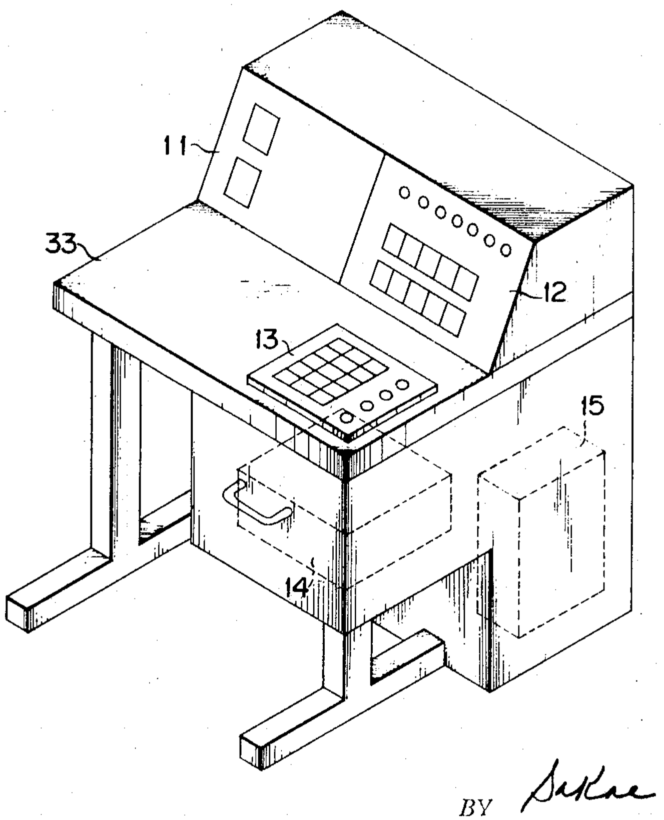
FIG. 5 is a perspective view of the embodiment of FIG. 2 when it is assembled.

FIG. 5 is a perspective view of a card-reading system when it is assembled. On the stand 33 are provided a tag reader 11, control circuit member 12 and keyboard 13, and below said stand 33 are disposed a paper tape punching device 14 and a data supply device for on-line operation 15. As mentioned above, the system of the present invention checks the parity, validity and order count of data read out and the manner in which a tag travels through the reading system and also detects a tag incapable of being read out, thus performing a reading operation with extremely great reliability. Further, the system of the invention allows the data of an error card to be again supplied to the system so as to correctly read out and, if required, data to be quickly supplied to an on-line external processing device.

There has been described the case where the system of the present invention is used in reading out data recorded in a tag attached to commercial commodities. The tag information to be read out by said system is not, of course, limited to 24 letters. Further, it will be apparent that the present invention is applicable in reading out data punched in other cards than said tag which are associated with the administration of warehouse inventory, fixtures and goods. It is also possible to record data from a punched card reader in a magnetic tape instead of being punched in a paper tape.

What is claimed is:

1. A punched card reading system comprising a punched card reading device consisting of means for reading out various data punched in a card and, where such reading is erroneously performed, means for selecting an error card from among normal cards; means for supplying by hand the data of a card unadapted to be read out by said card reading means; a control circuit consisting of means for performing the parity, validity and order count checks of data read out of the punched card, determining whether a card introduced into the reading system is capable or incapable of being read, when there is detected the erroneous reading of said card, actuating said selecting means so as to distinguish said error card from normal cards, where the card is found to travel in an abnormal condition, means for stopping the operation of the reading system so as to eliminate such abnormalities and means for transforming, if necessary, readout signals representing the data recorded in said punched card or supplied by said hand-feed device; a paper tape punching device for punching a paper tape according to the data signals drawn out of said control circuit; and an output device for supplying the data drawn out of said control circuit to an external processing device in an on-line connection: wherein said punched card reading device comprises a card-feed hopper for receiving punched cards, an error card receiving hopper positioned at a prescribed space from said card-feed hopper, a normal card receiving hopper disposed opposed to said error card receiving hopper, a read head interposed between said card-feed hopper and the mutually facing portions of said error card and normal card receiving hoppers, and a selector located near the inlets to said error card and normal card receiving hoppers, whereby there are taken punched cards in turn out of said card-feed hopper to be conducted to said read head where there is read out information punched therein and then to said normal card receiving hopper, and when there is detected erroneous reading, said selector is so actuated as to send the error card to said error card receiving hopper.

2. A punched card reading system comprising a punched card reading device consisting of means for reading out various data punched in a card and, where such reading is erroneously performed, means for selecting an error card from among normal cards; means for supplying by hand the data of a card unadapted to be read out by said card reading means; a control circuit consisting of means for performing the parity, validity and order count checks of data read out of the punched card, determining whether a card introduced into the reading system is capable or incapable of being read, when there is detected the erroneous reading of said card, actuating said selecting means so as to distinguish said error card from normal cards, where the card is found to travel in an abnormal condition, means for stopping the operation of the reading system so as to eliminate such abnormalities and means for transforming, if necessary, readout signals representing the data recorded in said punched card or supplied by said hand-feed device; a paper tape punching device for punching a paper tape according to the data signals drawn out of said control circuit; and an output device for supplying the data drawn out of said control circuit to an external processing device in an on-line connection: wherein a device involved in said control circuit for correcting erroneous reading comprises an order count checking circuit consisting of an initial code decoder, end code decoder and ring counter for counting the number of orders of the letters punched in a card so as to determine whether information supplied from either of said card-reading device and card-data hand-feed device in connection with the first and last letters represents the initial and end codes respectively, thereby confirming that the card information contains a prescribed number of orders; a circuit for performing the parity and validity checks of data signals from said card-reading device; a control circuit for indicating the erroneous reading detected by said checking circuit and controlling said selecting means; and a circuit for generating alert signals when a given card fails to be read out and controlling said selecting means; and data signal transforming device comprises a code inverter for converting the code of input data signals from said card-reading device, and encoder for encoding data signals from said card-data hand-feed device, and a data buffer supplied with signals from said code inverter and encoder.

3. A system according to claim 1 wherein the punched card is a tag.

* * * * *